US012731722B2

(12) United States Patent
Yoon et al.

(10) Patent No.: US 12,731,722 B2
(45) Date of Patent: Sep. 8, 2026

(54) COIL COMPONENT

(71) Applicant: SAMSUNG ELECTRO-MECHANICS CO., LTD., Suwon-si (KR)

(72) Inventors: Chan Yoon, Suwon-si (KR); Dong Hwan Lee, Suwon-si (KR); Dong Jin Lee, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1086 days.

(21) Appl. No.: 17/739,654

(22) Filed: May 9, 2022

(65) Prior Publication Data

US 2023/0008016 A1 Jan. 12, 2023

(30) Foreign Application Priority Data

Jul. 12, 2021 (KR) ........................ 10-2021-0091075

(51) Int. Cl.
*H01F 27/29* (2006.01)
*H01F 27/02* (2006.01)
*H01F 27/32* (2006.01)
*H01F 41/04* (2006.01)

(52) U.S. Cl.
CPC ............. *H01F 27/29* (2013.01); *H01F 27/02* (2013.01); *H01F 27/32* (2013.01); *H01F 41/04* (2013.01)

(58) Field of Classification Search
CPC .......... H01F 27/29; H01F 27/02; H01F 27/32; H01F 41/04
See application file for complete search history.

(56) References Cited

U.S. PATENT DOCUMENTS

2014/0292464 A1* 10/2014 Takagi .................. H01F 27/292 336/192
2016/0078995 A1* 3/2016 Yoon ................... H01F 17/0013 336/200
2017/0148561 A1* 5/2017 Yoon ...................... H05K 1/181
(Continued)

FOREIGN PATENT DOCUMENTS

JP 63-2974 U 1/1988
JP S63-2974 U 1/1988
(Continued)

OTHER PUBLICATIONS

Office Action issued on Oct. 2, 2025 in the corresponding Korean Patent Application No. 10-2021-0091075 with English translation.
(Continued)

*Primary Examiner* — Malcolm Barnes
(74) *Attorney, Agent, or Firm* — Morgan, Lewis & Bockius LLP

(57) ABSTRACT

A coil component includes a body including a first surface and a second surface disposed to oppose each other in a first direction, a first coil unit disposed in the body, and including a support member and a coil pattern disposed on at least one surface of the support member, a second coil unit disposed in the body, and including a wire-wound type coil; and a plurality of external electrodes connected to the first and second coil units, wherein a core axis of the first coil unit is not parallel to a core axis of the second coil unit.

30 Claims, 5 Drawing Sheets

(56) References Cited

U.S. PATENT DOCUMENTS

| | | | | |
|---|---|---|---|---|
| 2018/0122546 | A1* | 5/2018 | Lee | H01F 27/29 |
| 2019/0115135 | A1* | 4/2019 | Yoon | H01F 27/292 |

FOREIGN PATENT DOCUMENTS

| | | | | | |
|---|---|---|---|---|---|
| JP | H08250333 | A | * | 9/1996 | |
| JP | 2003151832 | A | * | 5/2003 | |
| JP | 2005-191256 | A | | 7/2005 | |
| JP | 2008021878 | A | * | 1/2008 | |
| JP | 2019-075537 | A | | 5/2019 | |
| KR | 10-2017-0058609 | A | | 5/2017 | |
| KR | 10-2018-0046826 | A | | 5/2018 | |
| WO | WO-03100853 | A1 | * | 12/2003 | H01F 27/363 |

OTHER PUBLICATIONS

Office Action issued on Dec. 9, 2025 in corresponding Japanese Patent Application No. 2022-080387 with English translation.

* cited by examiner

COIL COMPONENT

CROSS-REFERENCE TO RELATED APPLICATION(S)

This application claims the benefit of priority to Korean Patent Application No. 10-2021-0091075 filed on Jul. 12, 2021 in the Korean Intellectual Property Office, the disclosure of which is incorporated herein by reference in its entirety.

TECHNICAL FIELD

The present disclosure relates to a coil component.

BACKGROUND

In accordance with reductions in the size and thickness of electronic devices such as digital TVs, mobile phones, and laptop computers, reductions in the size and thickness of coil components applied to such electronic devices have also been demanded. In order to satisfy such demand, research and development of various wire-wound type or thin film type coil components have been actively conducted.

Together with reductions in the size and thickness of coil components, realizing the same characteristics as those of conventional coil components in despite the reductions in size and thickness of coil components has been a main goal. In order to satisfy such demand, it is necessary to increase a ratio of a magnetic material in a core to be filled with the magnetic material. However, there is a limit in increasing the ratio of the magnetic material in the core because frequency characteristics change depending on the strength or insulation properties of an inductor body.

Meanwhile, there is increasing demand for a coil component having an array that is advantageous in reducing an area in which the coil component is mounted. Such a coil component may have a non-coupled inductor array, a coupled inductor array, or a combination of a non-coupled inductor array and a coupled inductor array, depending on a coupling coefficient or a mutual inductance between a plurality of coil units. In the non-coupled inductor array, the plurality of coil units need to have a low coupling coefficient (k) therebetween, and the coupling coefficient can be reduced by increasing a distance between the plurality of coil units. However, the increase in distance between the coil units may cause an increase in size of the coil component, making it difficult to reduce the size of the coil component.

SUMMARY

An aspect of the present disclosure may implement a coil component having an inductor array not only capable of effectively reducing a coupling coefficient between a plurality of coil units but also suitable for size reduction.

According to an aspect of the present disclosure, a coil component includes a body including a first surface and a second surface disposed to oppose each other in a first direction, a first coil unit disposed in the body, and including a support member and a coil pattern disposed on at least one surface of the support member, a second coil unit disposed in the body, and including a wire-wound type coil, and a plurality of external electrodes connected to the first and second coil units, wherein a core axis of the first coil unit is not parallel to a core axis of the second coil unit.

The core axis of the first coil unit may be substantially perpendicular to the core axis of the second coil unit.

The core axis of the first coil unit may be substantially parallel to the first direction.

The core axis of the second coil unit may be substantially parallel to a second direction, perpendicular to the first direction.

The first and second coil units may be disposed side by side while being spaced apart from each other in the second direction.

The plurality of external electrodes may include: a plurality of first external electrodes disposed on a third surface and a fourth surface of the body, respectively, and connected to the coil pattern of the first coil unit, the third surface and the fourth surface of the body opposing each other in a third direction that is perpendicular to both the first and second directions; and a plurality of second external electrodes disposed on the third surface and the fourth surface of the body, respectively, and connected to the wire-wound type coil.

The second coil unit may include an insulating portion contacting a lead-out portion of the wire-wound type coil.

The insulating portion may include the same material as the support member.

The insulating portion may be thinner than the support member.

The coil pattern of the first coil unit may be a plating pattern.

The second coil unit may further include a filling portion filling a core region of the wire-wound type coil.

The filling portion and the body may include the same magnetic material.

An interface may be formed between the filling portion and the body to distinguish the filling portion and the body from each other.

According to another aspect of the present disclosure, a coil component includes: a body; a thin-film type inductor disposed in the body; a wire-wound type coil disposed in the body; and a plurality of external electrodes connected to the thin-film type inductor and the wire-wound type coil, wherein a core axis of the thin-film type inductor is substantially perpendicular to a core axis of the wire-wound type coil.

According to still another aspect of the present disclosure, a coil component includes: a body including a first surface and a second surface disposed to oppose each other in a first direction; a first coil unit disposed in the body; a second coil unit, which is a different type from the first coil unit, disposed in the body and spaced apart from the first coil unit in a second direction perpendicular to the first direction; and a plurality of external electrodes connected to the first and second coil units, wherein a core axis of one of the first and second coil units is substantially parallel to the first direction, and a core axis of a remaining one of the first and second coil units is substantially parallel to the second direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
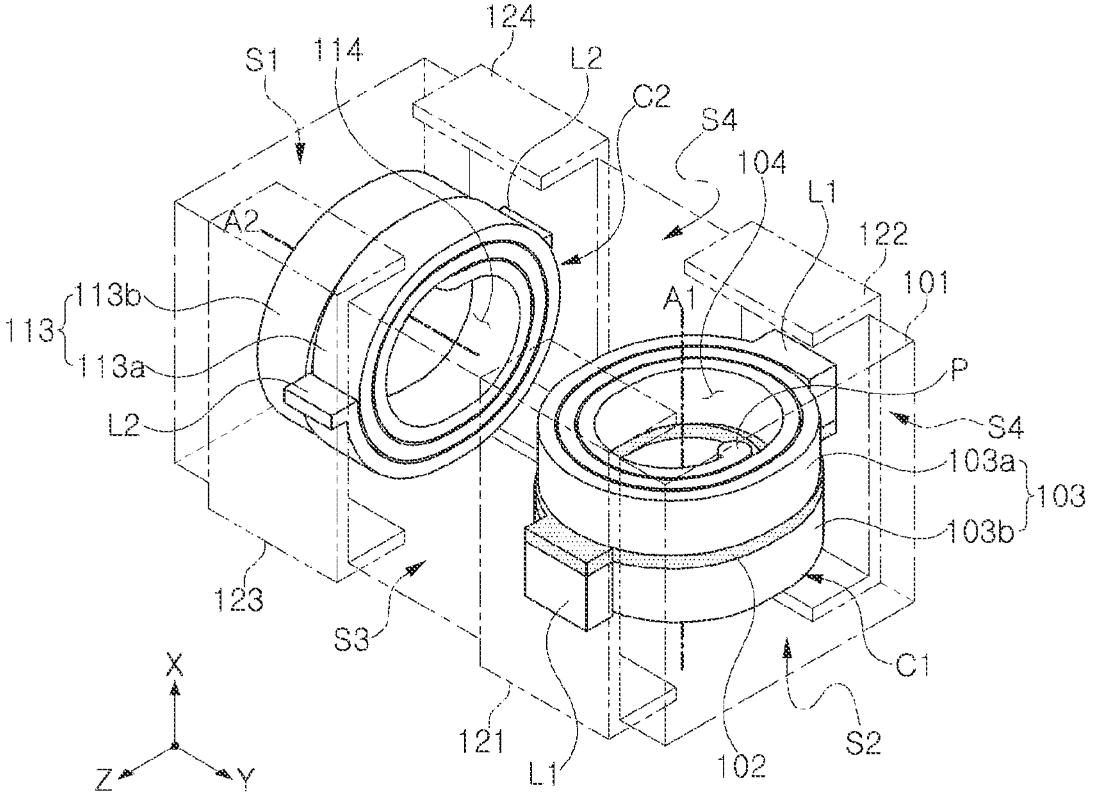
FIG. 1 is a schematic transparent perspective view illustrating a coil component according to an exemplary embodiment of the present disclosure.
Figure 2:
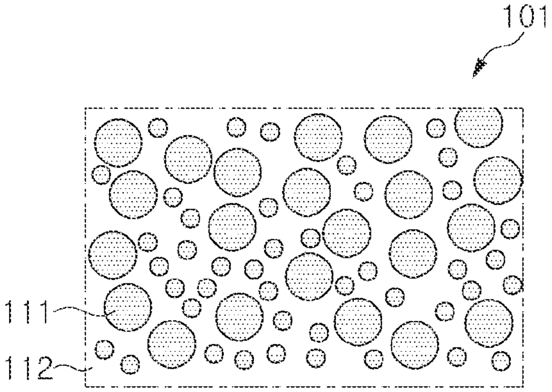
FIG. 2 is a cross-sectional view illustrating an example of a body applicable to the coil component of FIG. 1.
Figure 3:
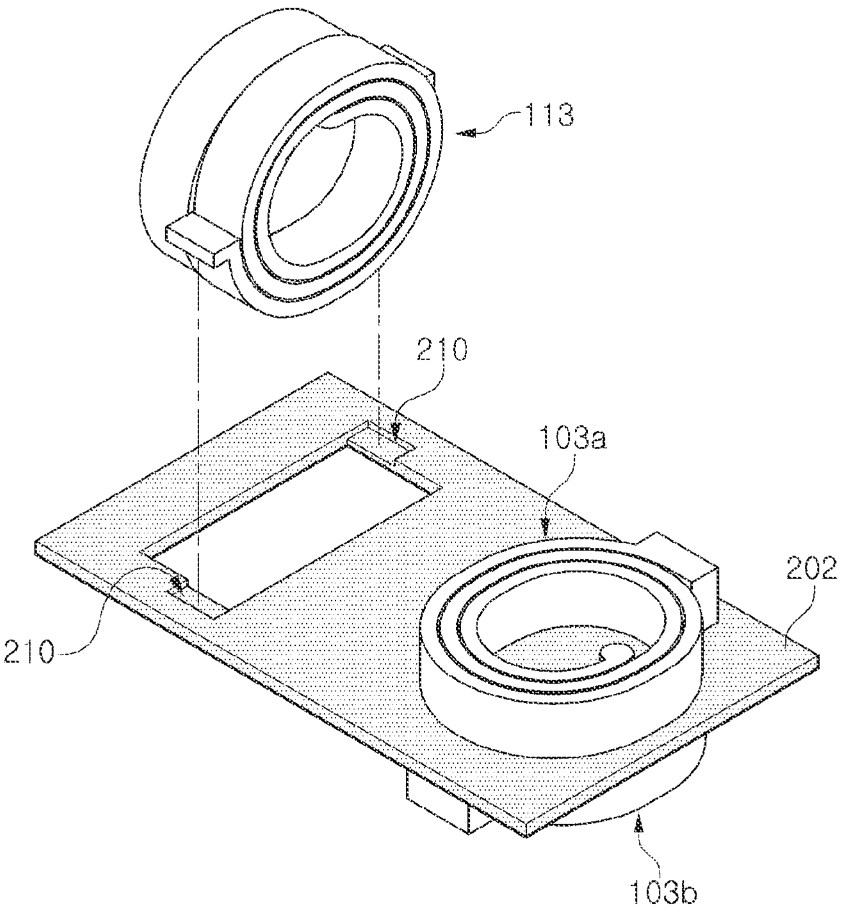
FIG. 3 illustrates an example of a method of manufacturing coil units for the coil component of FIG. 1.
Figure 4:
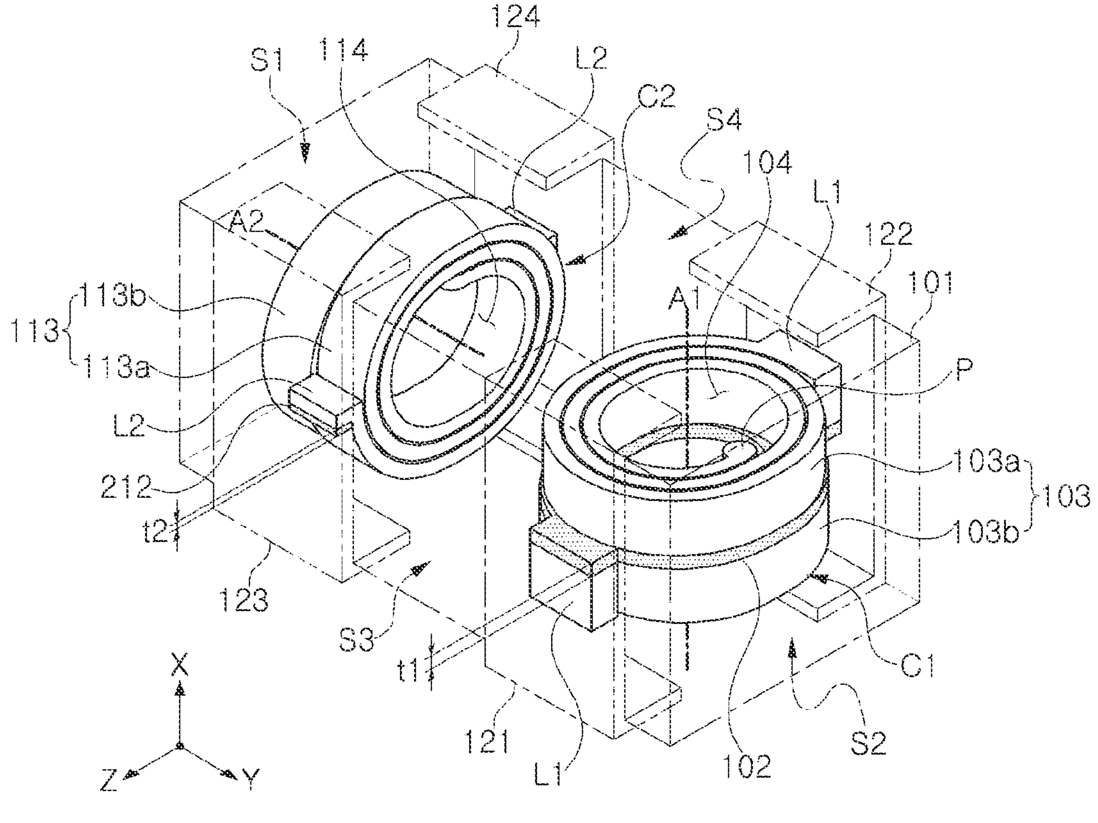
FIGS. 4, 5, 6 and 7 illustrate coil components according to modified exemplary embodiments.
Figure 5:
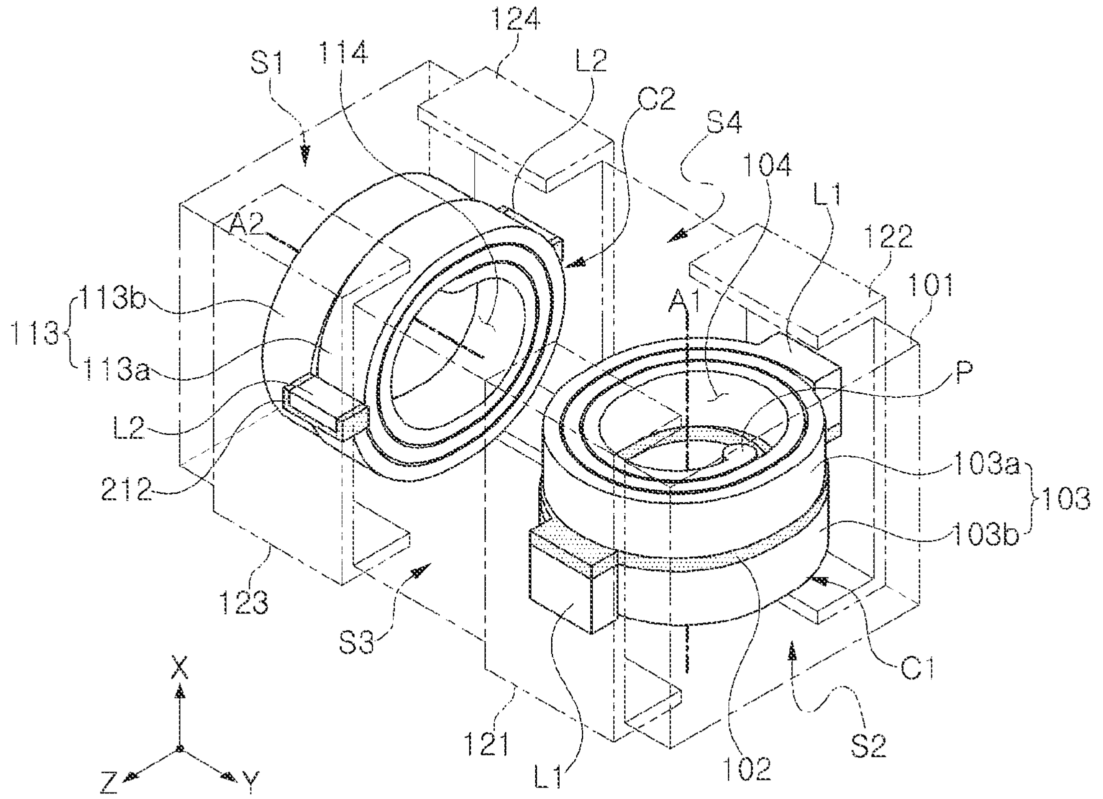

FIG. 1 is a schematic transparent perspective view illustrating a coil component according to an exemplary embodiment of the present disclosure. FIG. 2 is a cross-sectional view illustrating an example of a body applicable to the coil component of FIG. 1. FIG. 3 illustrates an example of a method of manufacturing coil units for the coil component of FIG. 1. FIGS. 4 through 7 illustrate coil components according to modified exemplary embodiments.

Referring to FIG. 1, a coil component 100 according to an exemplary embodiment of the present disclosure may include a body 101, a first coil unit C1, a second coil unit C2, and a plurality of external electrodes 121, 122, 123, and 124. Here, a direction of a core axis A1 of the first coil unit C1 and a direction of a core axis A2 of the second coil unit C2 may not be parallel to each other. When the core axes A1 and A2 of the first and second coil units C1 and C2 are not parallel to each other as in the present embodiment, for example, when the core axes A1 and A2 of the first and second coil units C1 and C2 are perpendicular to each other, it may be difficult for a magnetic flux to pass through a core portion 114 of the second coil unit C2 during an operation of the first coil unit C1. Similarly, it may be difficult for a magnetic flux to pass through a core portion 104 of the first coil unit C1 during an operation of the second coil unit C2, resulting in a reduction in coupling coefficient (k) between the first and second coil units C1 and C2. Hereinafter, main elements constituting the coil component 100 according to the present exemplary embodiment will be described.

The body 101 may form an overall exterior of the coil component 100, with the first and second coil units C1 and C2, etc. disposed therein. As illustrated in FIG. 2, the body 101 may include a plurality of magnetic particles 111, and the magnetic particles 111 may be dispersed in an insulating material 112. The insulating material 112 may include a polymer ingredient such as an epoxy resin or polyimide. The plurality of magnetic particles 111 included in the body 101 may include an Fe-based alloy ingredient, e.g., an Fe—Si—B—C-based alloy.

When the magnetic particles 111 are implemented with the Fe-based alloy, magnetic properties such as a saturation magnetization value may be excellent, and an insulating film may be formed on at least a portion of a surface of the magnetic particle 111, for example, for the purpose of reducing eddy current loss. In addition, the body 101 may include a ferrite ingredient in addition to or replacing the magnetic metal.

As an example of a manufacturing method, the body 101 may be formed by lamination. Specifically, a plurality of unit laminates for manufacturing the body 101 may be provided and stacked on and under the first and second coil units C1 and C2. Here, the unit laminates may be manufactured in a sheet type by preparing a slurry, applying the slurry at a thickness of several tens of micrometers on carrier films by a doctor blade method, and then drying the slurry, the slurry being prepared by mixing a thermosetting resin and organic materials such as a binder and a solvent with the magnetic particles 111 such as metals. Therefore, the unit laminates may be manufactured in a form in which the magnetic particles are dispersed in the thermosetting resin such as an epoxy resin or a polyimide resin.

The first coil unit C1 may include a support member 102 and a coil pattern 103 formed on at least one surface of the support member 102, and correspond to a so-called thin film type inductor. The coil pattern 103 may be formed in a spiral shape, and may have a lead-out portion L1 formed at an outermost portion of the spiral coil pattern and exposed to the outside of the body 101 for electrical connection to an external electrode. The coil pattern 103 may be disposed on at least one surface of the support member 102. As in the present exemplary embodiment, the coil patterns 103 may be disposed on both upper and lower surfaces of the support member 102, and in this case, each of the coil patterns 103 may include a pad region P. In addition, the first coil pattern 103*a* and the second coil pattern 103*b* formed on the upper and lower surfaces of the support member 102, respectively, may be electrically connected to each other through a conductive via penetrating through the support member 102. Alternatively, the coil pattern 103 may be disposed on only one surface of the support member 102. Meanwhile, the coil pattern 103 may be formed by a plating process used in the related art, e.g., a pattern plating process, an anisotropic plating process, or an isotropic plating process, and may also be formed in a multilayer structure using a plurality of types of plating processes among the above-described plating processes.

The support member 102, which supports the coil pattern 103 of the first coil unit C1, may be formed of a polypropylene glycol (PPG) substrate, a ferrite substrate, a metal-based soft magnetic substrate, or the like. As illustrated, a through hole may be formed in a central portion of the support member 102, and the core portion 104 may be formed by filling the through hole with a material constituting the body 101.

The second coil unit C2 may include a wire-wound type coil 113, which has lead-out portions L2 connected to external electrodes 123 and 124 at ends thereof. In order to secure a sufficient number of turns, the wire-wound type coil 113 may be implemented by stacking two coils 113*a* and 113*b* electrically connected to each other. In this case, a support member for supporting the wire-wound type coil 113 may not be disposed inside the body 101. The wire-wound type coil 113 may be formed by winding a metal wire such as a Cu wire including a metal line and a coating layer coating a surface of the metal line. Thus, an entire surface of the wire-wound type coil 113 in each of the plurality of turns may be coated with the coating layer. Meanwhile, the metal wire may be a straight-angle wire, but is not limited thereto. When the wire-wound type coil 113 is formed of the straight-angle wire, the wire-wound type coil 113 may have a rectangular cross section in each of the turns. The coating layer may include epoxy, polyimide, liquid crystal polymer, and the like either alone or in combination, but is not limited thereto.

In the present exemplary embodiment, the core axis A1 of the first coil unit C1 and the core axis A2 of the second coil unit may not be parallel to each other. Here, the core axis A1 of the first coil unit C1 may be defined as a central axis of the core portion 104 formed inside the coil pattern 103 that turns therearound. Similarly, the core axis A2 of the second coil unit C2 may be defined as a central axis of the core portion 104 formed inside the wire-wound type coil 113 that turns therearound. By disposing the first and second coil units C1 and C2 so that the core axis A1 of the first coil unit C1 and the core axis A2 of the second coil unit are not parallel to each other, a coupling coefficient (k) may be reduced. In the present exemplary embodiment, the first and second coil units C1 and C2 are disposed so that the core axes A1 and A2 are perpendicular to each other as illustrated in FIG. 1 in order to maximize the coupling coefficient (k) reducing effect. However, it is not necessary that the core axes A1 and A2 be exactly perpendicular to each other, and even if the core axes A1 and A2 are slightly deviated indirection for disposing them to be exactly perpendicular to each other, the coupling coefficient (k) can still be reduced.

As illustrated, the first coil unit C1 may be disposed so that the core axis A1 is parallel to a first direction (X-direction) of the body 101. Here, the first direction (X-direction) may be a direction perpendicular to a first surface S1 and a second surface S2 facing each other of the body 101, and the first surface S1 or the second surface S2 of the body 101 may be a mounting surface when the coil component 100 is mounted on a substrate or the like. The second coil unit C2 may be disposed so that the core axis A2 is parallel to a second direction (Y-direction) perpendicular to the first direction (X-direction). In this case, the first and second coil units C1 and C2 may be disposed side by side while being spaced apart from each other in the second direction (Y-direction). Even when the core axes A1 and A2 are not perpendicular to each other as described above, the first and second coil units C1 and C2 may be disposed side by side while being spaced apart from each other in the second direction (Y-direction).

As described above, the first and second coil units C1 and C2 have different structures. Specifically, the first coil unit C1 may be implemented as a thin film type inductor including a support member and a coil pattern, and the second coil unit C2 may be implemented as a wire-wound type inductor. When the first and second coil units C1 and C2 are implemented in different types of inductors as described above, it may be easy to dispose the first and second coil units C1 and C2 so that the core axes A1 and A2 thereof are perpendicular or substantially perpendicular to each other. For example, when both the two coil units are implemented as thin film type inductors, it may be difficult to change a direction in which the support member and the coil pattern are disposed, and particularly, it may be very difficult in terms of process to dispose the two adjacent coil units to be perpendicular to each other. In the present exemplary embodiment, the two coil units C1 and C2 are implemented in different types to make it easy to dispose the two coil units to have core axes in different directions. This will be described below with reference to FIG. 3.

One or ordinary skill in the art would understand that the expression "substantially perpendicular" may mean not only being exactly perpendicular (90°) but also being close to perpendicular including process errors, positional deviations, and/or measurement errors that may occur in a manufacturing process, and the range thereof may be widely accepted in the art. Similarly, one or ordinary skill in the art would understand that the expression "substantially parallel" may mean not only being exactly parallel (0° or 180°) but also being close to parallel including process errors, positional deviations, and/or measurement errors that may occur in a manufacturing process, and the range thereof may be widely accepted in the art.

The plurality of external electrodes 121, 122, 123, and 124 may be connected to the first and second coil units C1 and C2. The plurality of external electrodes 121, 122, 123, and 124 may be formed using a paste including a metal having excellent electrical conductivity, e.g., a conductive paste including nickel (Ni), copper (Cu), tin (Sn), silver (Ag), or alloys thereof. In addition, a plating layer may be provided to cover each of the plurality of external electrodes 121, 122, 123, and 124. In this case, the plating layer may include one or more selected from the group consisting of nickel (Ni), copper (Cu), and tin (Sn). For example, the plating layer may be formed by sequentially stacking a nickel (Ni) layer and a tin (Sn) layer. Among the plurality of external electrodes 121, 122, 123, and 124, the plurality of first external electrodes 121 and 122 may be connected to the coil pattern 103 of the first coil unit C1. To this end, the plurality of first external electrodes 121 and 122 may be disposed on a third surface S3 and a fourth surface S4 of the body 101, respectively facing each other. In this case, the third surface S3 and the fourth surface S4 of the body 101 may be perpendicular to a third direction (Z direction) that is perpendicular to both the first direction X and the second direction Y. In addition, the plurality of second the external electrodes 123 and 124 may be disposed on the third surface S3 and the fourth surface S4 of the body 101, respectively, to be connected to the wire-wound type coil 113.

An example of a method of forming the coil units will be described with reference to FIG. 3. In the first coil unit C1, the coil patterns 103*a* and 103*b* may be formed on upper and lower surfaces of a support member 202, respectively, by plating or the like. In the second coil unit C2, a hole for accommodating the wire-wound type coil 113 may be formed in the support member 202, and then the wire-wound type coil 113 may be disposed in the hole with grooves 210 provided in the support member 202 to hold the wire-wound type coil 113. After the first and second coil units C1 and C2 are formed, a trimming process for removing a partial portion of the support member 202 may be performed, and the support member 202 may only remain in the first coil unit C1 as illustrated in FIG. 1. Alternatively, as in a modified exemplary embodiment of FIG. 4, a partial portion of the support member 202 may remain in the second coil unit C2 as well. Specifically, the support member may remain as an insulating portion 212, and the insulating portion 212 may contact the lead-out portion of the wire-wound type coil 113. Since the insulating portion 212 and the support member 102 are separated out of one body in the manufacturing process, the insulating portion 212 may include the same material as the support member 102. In addition, the insulating portion 212 may be a region corresponding to the groove 210 of the support member 202, and thus, the insulating portion 212 may be thinner than the support member 102 ($t2<t1$). The insulating portion 212 may have a shape different from that of FIG. 4. For example, as in a modified exemplary embodiment of FIG. 5, the insulating portion 212 may be not only formed on a lower surface of the lead-out portion L2 of the wire-wound type coil 113, but also extending therefrom to cover side surface of the lead-out portion L2.

Figure 6:
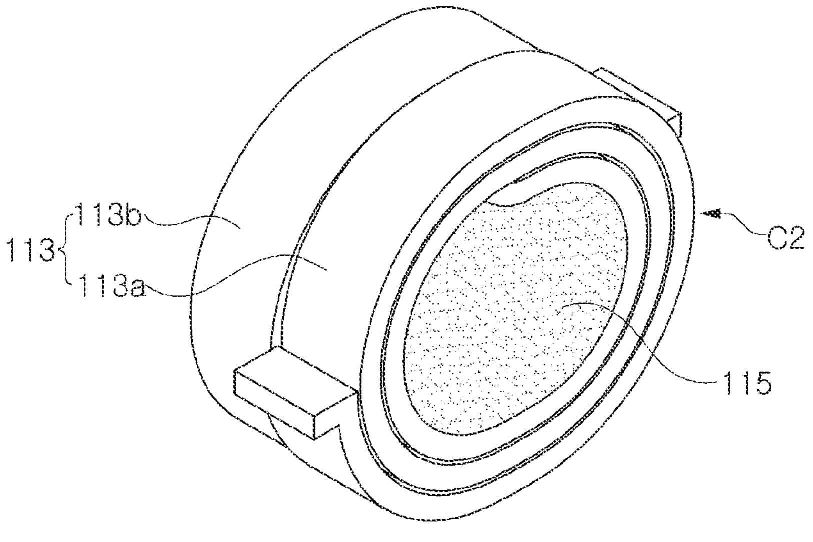

Meanwhile, as in a modified exemplary embodiment of FIG. 6, the second coil unit C2 may further include a filling portion 115 filling a core region of the wire-wound type coil 113. The filling portion 115 and the body 101 may include the same magnetic material, and in this case, an interface may be formed between the filling portion 115 and the body 101 to distinguish the filling portion and the body from each other. In a case in which the filling portion 115 is disposed in the core region of the wire-wound type coil 113, it is possible to minimize deformation of the wire-wound type coil 113 in the above-described process for forming the body 101. In other words, in a case in which the second coil unit C2 does not include a filling portion 115, there is concern that the wire-wound type coil 113 may be deformed in a process of stacking and compressing a plurality of sheets for forming the body 101. By employing the filling portion 115 as in the exemplary embodiment of FIG. 6, the structural stability of the second coil unit C2 may be improved.

Figure 7:
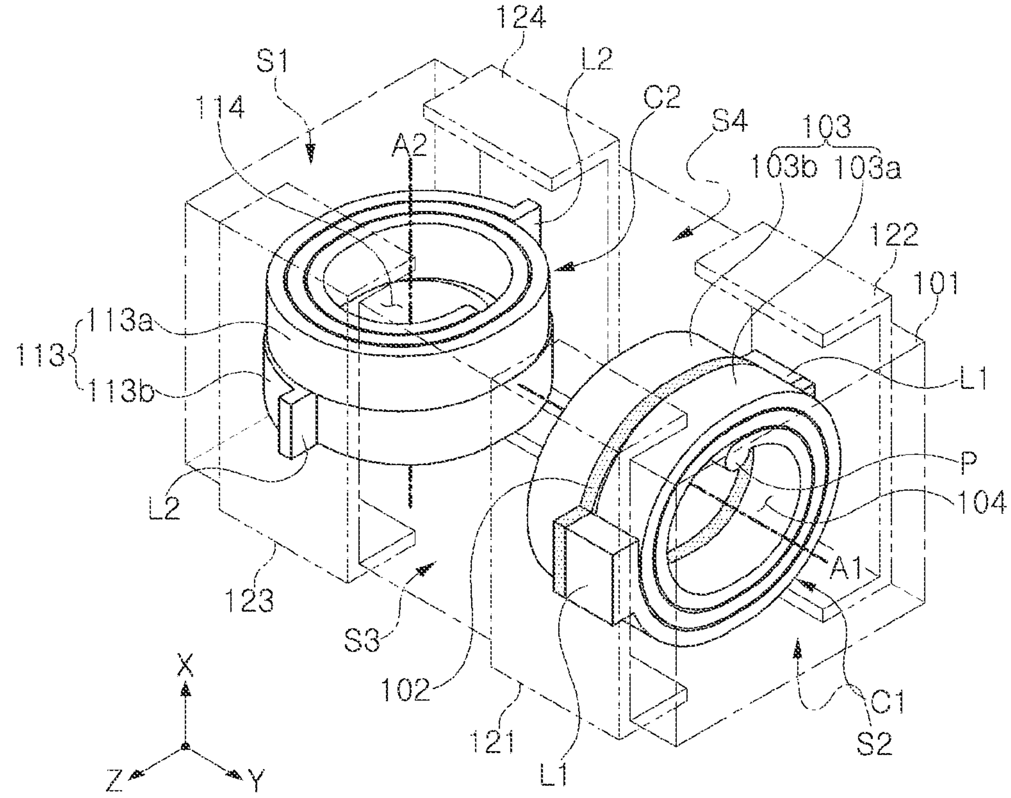

Next, in a modified exemplary embodiment of FIG. 7, the directions in which the first coil unit C1 and the second coil unit C2 are disposed may be different from those in FIG. 1. The core axis A1 of the first coil unit C1 may be perpendicular to the first direction (X-direction), and the core axis A2 of the second coil unit C2 may be parallel to the first direction (X-direction). In this way, the structure in which the core axes A1 and A2 of the first and second core units C1 and C2 are not parallel to each other may also be implemented by disposing the second coil unit C2 in a direction (X-direction) in which the core axis A2 is perpendicular to the first surface S1 and the second surface S2, which are main surfaces of the body 101, and disposing the first coil unit C1 in a direction in which the core axis A1 is parallel to a direction (Y-direction) in which the first and second coil units C1 and C2 are arranged side by side.

As set forth above, according to the exemplary embodiment in the present disclosure, the coil component is capable of effectively reducing a coupling coefficient between a plurality of coil units without increasing a distance between the plurality of coil units.

While exemplary embodiments have been shown and described above, it will be apparent to those skilled in the art that modifications and variations could be made without departing from the scope of the present invention as defined by the appended claims.

What is claimed is:

1. A coil component comprising:
- a body including a first surface and a second surface disposed to oppose each other in a first direction;
- a first coil unit disposed in the body, and including a support member and a coil pattern disposed on at least one surface of the support member;
- a second coil unit disposed in the body, and including a wire-wound type coil; wherein the wire-wound type coil includes a metal wire in a spiral shape, and
- a plurality of external electrodes connected to the first and second coil units,
- wherein a core axis of the first coil unit is not parallel to a core axis of the second coil unit.

2. The coil component of claim 1, wherein the core axis of the first coil unit is substantially perpendicular to the core axis of the second coil unit.

3. The coil component of claim 1, wherein the core axis of the first coil unit is substantially parallel to the first direction.

4. The coil component of claim 3, wherein the core axis of the second coil unit is substantially parallel to a second direction perpendicular to the first direction.

5. The coil component of claim 4, wherein the first and second coil units are disposed side by side while being spaced apart from each other in the second direction.

6. The coil component of claim 5, wherein the plurality of external electrodes include:
- a plurality of first external electrodes disposed on a third surface and a fourth surface of the body, respectively, and connected to the coil pattern of the first coil unit, the third surface and the fourth surface of the body opposing each other in a third direction that is perpendicular to both the first and second directions; and
- a plurality of second external electrodes disposed on the third surface and the fourth surface of the body, respectively, and connected to the wire-wound type coil.

7. The coil component of claim 1, wherein the first and second coil units are disposed side by side while being spaced apart from each other in a second direction perpendicular to the first direction.

8. The coil component of claim 7, wherein the core axis of the first coil unit is substantially parallel to the second direction.

9. The coil component of claim 8, wherein the core axis of the second coil unit is substantially parallel to the first direction.

10. The coil component of claim 9, wherein the plurality of external electrodes include:
- a plurality of first external electrodes disposed on a third surface and a fourth surface of the body, respectively, and connected to the coil pattern of the first coil unit, the third surface and the fourth surface of the body opposing each other in a third direction that is perpendicular to both the first and second directions; and
- a plurality of second external electrodes disposed on the third surface and the fourth surface of the body, respectively, and connected to the wire-wound type coil.

11. The coil component of claim 1, wherein the second coil unit includes an insulating portion contacting a lead-out portion of the wire-wound type coil.

12. The coil component of claim 11, wherein the insulating portion includes the same material as the support member.

13. The coil component of claim 12, wherein the insulating portion is thinner than the support member.

14. The coil component of claim 1, wherein the coil pattern of the first coil unit is a plating pattern.

15. The coil component of claim 1, wherein the second coil unit further includes a filling portion filling a core region of the wire-wound type coil.

16. The coil component of claim 15, wherein the filling portion and the body include the same magnetic material.

17. The coil component of claim 16, wherein an interface is formed between the filling portion and the body to distinguish the filling portion and the body from each other.

18. A coil component comprising:
- a body;
- a thin-film type inductor disposed in the body;
- a wire-wound type coil disposed in the body; wherein the wire-wound type coil includes a metal wire in a spiral shape, and
- a plurality of external electrodes connected to the thin-film type inductor and the wire-wound type coil,
- wherein a core axis of the thin-film type inductor is substantially perpendicular to a core axis of the wire-wound type coil.

19. The coil component of claim 18, wherein the thin-film type inductor includes a support member and a coil pattern disposed on at least one surface of the support member.

20. The coil component of claim 18, wherein the body includes a first surface and a second surface disposed to oppose each other in a first direction, and
- the thin-film type inductor and the wire-wound type coil are disposed side by side while being spaced apart from each other in a second direction perpendicular to the first direction.

21. The coil component of claim 20, wherein the core axis of the thin-film type inductor is substantially parallel to the first direction, and
- the core axis of the wire-wound type coil is substantially parallel to the second direction.

22. The coil component of claim 21, wherein the plurality of external electrodes include:

a plurality of first external electrodes disposed on a third surface and a fourth surface of the body, respectively, and connected to a coil pattern of the thin-film type inductor, the third surface and the fourth surface of the body opposing each other in a third direction that is perpendicular to both the first and second directions; and a plurality of second external electrodes disposed on the third surface and the fourth surface of the body, respectively, and connected to the wire-wound type coil.

23. The coil component of claim 20, wherein the core axis of the thin-film type inductor is substantially parallel to the second direction, and the core axis of the wire-wound type coil is substantially parallel to the first direction.

24. The coil component of claim 23, wherein the plurality of external electrodes include:

a plurality of first external electrodes disposed on a third surface and a fourth surface of the body, respectively, and connected to a coil pattern of the thin-film type inductor, the third surface and the fourth surface of the body opposing each other in a third direction that is perpendicular to both the first and second directions; and a plurality of second external electrodes disposed on the third surface and the fourth surface of the body, respectively, and connected to the wire-wound type coil.

25. A coil component comprising:

a body including a first surface and a second surface disposed to oppose each other in a first direction;

a first coil unit disposed in the body;

a second coil unit, which is a different type from the first coil unit, disposed in the body and spaced apart from the first coil unit in a second direction perpendicular to the first direction; and a plurality of external electrodes connected to the first and second coil units, wherein a core axis of one of the first and second coil units is substantially parallel to the first direction, the second coil unit includes a wire-wound type coil, wherein the wire-wound type coil includes a metal wire in a spiral shape, and a core axis of a remaining one of the first and second coil units is substantially parallel to the second direction.

26. The coil component of claim 25, wherein the first coil unit includes a thin-film type inductor comprising a support member and a coil pattern disposed on at least one surface of the support member.

27. The coil component of claim 26, wherein a core axis of the first coil unit is substantially parallel to the first direction, and a core axis of the second coil unit is substantially parallel to the second direction.

28. The coil component of claim 27, wherein the plurality of external electrodes include:

a plurality of first external electrodes disposed on a third surface and a fourth surface of the body, respectively, and connected to the coil pattern of the first coil unit, the third surface and the fourth surface of the body opposing each other in a third direction that is perpendicular to both the first and second directions; and a plurality of second external electrodes disposed on the third surface and the fourth surface of the body, respectively, and connected to the second coil unit.

29. The coil component of claim 26, wherein a core axis of the first coil unit is substantially parallel to the second direction, and a core axis of the second coil unit is substantially parallel to the first direction.

30. The coil component of claim 29, wherein the plurality of external electrodes include:

a plurality of first external electrodes disposed on a third surface and a fourth surface of the body, respectively, and connected to the coil pattern of the first coil unit, the third surface and the fourth surface of the body opposing each other in a third direction that is perpendicular to both the first and second directions; and a plurality of second external electrodes disposed on the third surface and the fourth surface of the body, respectively, and connected to the second coil unit.

* * * * *